(12) United States Patent
Ertle et al.

(10) Patent No.: US 6,312,639 B1
(45) Date of Patent: Nov. 6, 2001

(54) PROCESSING AID FOR THERMOPLASTIC RESIN COMPOSITIONS

(75) Inventors: Raymond T. Ertle; Raymond J. Ertle, both of Pompton Plains, NJ (US)

(73) Assignee: Cylatec, Inc., Canton, OH (US)

( * ) Notice: Subject to any disclaimer, the term of this patent is extended or adjusted under 35 U.S.C. 154(b) by 0 days.

(21) Appl. No.: 09/697,402

(22) Filed: Oct. 26, 2000

Related U.S. Application Data

(63) Continuation-in-part of application No. 08/946,188, filed on Oct. 7, 1997, now abandoned.
(60) Provisional application No. 60/027,965, filed on Oct. 8, 1996, and provisional application No. 60/035,158, filed on Jan. 10, 1997.

(51) Int. Cl.$^7$ ........................................................ B29B 7/00
(52) U.S. Cl. ................... 264/349; 264/37.26; 264/176.1; 524/450; 524/492; 524/494
(58) Field of Search ..................................... 524/492, 494, 524/450; 264/37.26, 176.1, 349

(56) References Cited

U.S. PATENT DOCUMENTS

| | | |
|---|---|---|
| 3,956,230 | 5/1976 | Gaylord . |
| 4,049,593 | 9/1977 | Sato et al. . |
| 4,071,494 | 1/1978 | Gaylord . |
| 4,146,510 | 3/1979 | Miyanoki et al. . |
| 4,244,860 | 1/1981 | Kuhnel et al. . |
| 4,317,765 | 3/1982 | Gaylord . |
| 4,374,641 | 2/1983 | Burlone . |
| 4,417,018 | 11/1983 | Ogawa et al. . |
| 4,521,333 | 6/1985 | Graham et al. . |
| 4,525,494 | 6/1985 | Andy . |
| 4,551,485 | 11/1985 | Ragan et al. . |
| 4,588,523 | 5/1986 | Tashlick et al. . |
| 4,810,733 | 3/1989 | Sakuma et al. . |
| 4,891,399 | 1/1990 | Ohkawa et al. . |
| 4,952,615 | 8/1990 | Welna . |
| 5,021,508 | 6/1991 | Taubitz et al. . |
| 5,041,259 * | 8/1991 | Fujii et al. ........................... 264/349 |
| 5,079,287 * | 1/1992 | Takeshi et al. ....................... 524/528 |
| 5,139,760 | 8/1992 | Ogawa et al. . |
| 5,196,262 | 3/1993 | Schwarz et al. . |
| 5,219,903 * | 6/1993 | Fujii et al. ........................... 523/351 |
| 5,246,654 | 9/1993 | Ertle et al. . |
| 5,344,866 * | 9/1994 | Hall ..................................... 524/450 |
| 5,374,675 | 12/1994 | Plachetta et al. . |
| 5,436,296 | 7/1995 | Swamikannu et al. . |
| 5,476,891 | 12/1995 | Welna . |
| 5,501,826 | 3/1996 | Ertle et al. . |
| 5,502,099 | 3/1996 | Wallace . |
| 5,578,671 | 11/1996 | Welna . |
| 5,612,386 | 3/1997 | Ertle et al. . |
| 5,814,384 | 9/1998 | Akkapeddi et al. . |

* cited by examiner

Primary Examiner—Judy M. Reddick
(74) Attorney, Agent, or Firm—Klauber & Jackson

(57) ABSTRACT

Processing aids comprising amorphous particulate silicates containing from about 2% to about 50% water, are utilized in processes for compounding thermoplastic resins, allowing higher levels of additives to be more effectively incorporated into the thermoplastic resins. The processing aids allow greater dispersion of pigments and other additives in compounded thermoplastic resins and concentrates.

13 Claims, No Drawings

PROCESSING AID FOR THERMOPLASTIC RESIN COMPOSITIONS

CROSS-REFERENCE TO RELATED APPLICATIONS

This application is a continuation-in-part of application Ser. No. 08/946,188, filed Oct. 7, 1997, now abandoned.

This application claims the benefit of Provisional Application No. 60/027,965 filed Oct. 8, 1996, and of Provisional Application No. 60/035,158 filed Jan. 10, 1997.

This invention is also the subject of a related Disclosure Document, filed at the United States Patent and Trademark Office on Jun. 8, 1995 under Ser. No. 378,751 and referenced in the above Provisional Applications. This document is hereby incorporated by reference.

FIELD OF INVENTION

The invention described herein relates to chemical processing aids for thermoplastic resins which allow higher levels of additives to be more effectively incorporated into said thermoplastics, and which allow greater dispersion of pigments and other additives in compounded concentrates.

BACKGROUND OF THE INVENTION

It is well known in the art to add fillers and/or reinforcing agents to thermally processed polymers (thermoplastic resins). These thermoplastic resins, such as low or high density polyethylene, polypropylene, polycarbonate, nylon, etc. as well as numerous co-polymers such as acrylonitrile-butadiene-styrene etc. are normally processed by heated screw extrusion and may be extruded into shapes or molded via conventional injection or blow molding processes. By incorporating additives into a thermoplastic resin before or during processing in a thermoplastic extruder, a homogeneous mixture of additives and melted thermoplastic resin is formed. This plastic mixture may then be extruded through a die to form continuous shapes, sheets or films, or may be injected into a mold as in an injection molding process to directly form parts of various shapes and configurations, or may be extruded into a parison which is expanded into a mold in a blow molding process. These additives usually consist of fillers such as talc, wood flour, starch, calcium carbonate or flame retardants such as aluminum trihydrate or halogenated compounds, or reinforcing agents such as mica or glass or graphite fibers, or other functional additives, such as colorants, pigments, extenders, blowing agents, surface modifiers, density modifiers, impact modifiers, thermal and electrical conductivity modifiers, or a combination of these ingredients.

It is highly desirable to be able to incorporate additives in thermoplastic resins for many end use applications, in that the finished part can have a lower organic plastic content, which may in turn mitigate recycling problems, lower the propensity of the part to burn, and employ less raw materials from non-renewable sources such as petroleum. In addition, stronger parts with better physical characteristics such as higher heat distortion temperatures can be produced, which allows the use of thinner, lighter parts for many applications such as automotive use, wherein these lighter parts translate to higher fuel mileage for vehicles using them. The incorporation of flame retardant additives imparts flame retardancy which is required for numerous applications, and pigments and colors are usually added for aesthetic reasons.

The amount of additive that can be incorporated into a finished part is limited by the increase in effective melt viscosity experienced when incorporating the additive into the thermoplastic resin, and by the ability of the resin to wet out, and thus contain in a continuous phase, additional amounts of additive. Unwetted additive particles contained in the compound will adversely affect the physical properties of the finished part. As the additive content of the mixture is increased, the melt viscosity of the compound increases and makes it more difficult to produce the desired parts. In injection molding, for instance, increasing the viscosity of the melt mix beyond a certain point causes a problem in that the extremities of the mold cavities may not be properly filled, and areas of finer detail in the mold will not be properly reproduced. In extrusion processes, additive content over a certain maximum will cause a poor surface, and make the hot newly formed extrusion extremely difficult to handle since it will be prone to discontinuities when deflected during handling. Poor processing rheology in the form of high effective viscosity also hinders transport of the additive/thermoplastic resin mix within the extruder and through downstream equipment, such as check valves and hot manifold systems. Also, fire retardant additives will not be properly dispersed, rendering them less effective.

In the production of compounded concentrates, such as color concentrates, large amounts of dyes or pigments are processed with a thermoplastic resin melt to produce high color content particles or pellets. A portion of these color concentrate pellets can then be later employed to color a natural color resin in subsequent thermoplastic processes by combining an amount of these color concentrate pellets with natural color resin pellets and feeding this mixture to an injection molding machine or other heated screw process, wherein the individual pellets in the mixture are melted and combined to form the desired color in the finished part. In these instances, the degree of dispersion of the individual pigment particles within the resin relates to the effective utilization of the pigment in its final intended use, that is, in the coloring of a finished part. Where dispersion is poor, more pigment must be employed to achieve a given color intensity. Extremely fine pigment particles tend to agglomerate, and although the outer surfaces of the agglomerates may be wetted with resin, the individual particles in the agglomerates are not, thus lowering the effective surface area of the pigment and its effectiveness for its intended purpose. In many instances waxes and/or stearates, which are not normally desired in a finished article, must be added in amounts up to 10% or higher to wet out pigments.

Raising the compounding temperature to improve processing rheology can lower the viscosity of the resin and thus help in the wetting out of additives, but this approach has limitations due to the heat sensitivity of the resin and possibly of some of the additives, such as heat sensitive organics or hydrated fire retardant fillers or other ingredients in the compound, and higher temperatures result in longer molding cycle times.

A number of issued patents can be noted which are of interest. U.S. Pat. No. 5,041,259 produces filled and colored thermoplastic resin compositions by employing a process involving multiple addition and mixing steps.

U.S. Pat. No. 4,891,399 relates to the treatment of fillers with silane and titanate coupling agents and silicone fluids for incorporation into a thermoplastic resin.

U.S. Pat. No. 4,810,733 relates to the production of color concentrates wherein large amounts of non-thermoplastic resin components including waxes and/or stearates must be added to the concentrate.

U.S. Pat. No. 4,551,485 treats reinforcing fillers with organic functional silane.

U.S. Pat. No. 4,525,494 relates to the pretreatment of alumina trihydrate with isostearic acid and then compounding the treated alumina trihydrate with a titanate coupling agent and a thermoplastic resin.

U.S. Pat. No. 4,417,018 treats a flame retardant filler with alkoxysilane as a coupling agent for inclusion into a thermoplastic resin.

U.S. Pat. No. 4,374,641 employs solvents in the preparation of color concentrates which must be removed before use.

U.S. Pat. Nos. 4,317,765, 4,071,494 and 3,956,230 compatibilize a filler with a thermoplastic resin by mixing the two in the presence of a peroxide catalyst and maleic anhydride and this mixture is subsequently mixed with additional resin.

U.S. Pat. No. 4,244,860 employs silane additives to prevent the separation of fillers and additives from thermoplastic molding compounds during processing.

The above described examples of prior art along with numerous other patents also describe similar complicated mixing or coupling agent systems. One of the major drawbacks which many of these approaches share is the necessity of pretreating the additive before incorporating it into a thermoplastic resin. This pretreatment is often an elaborate process, usually requiring high shear mixing, solvent or diluent application, and subsequent filler drying, which processing steps add a great deal of cost to the finished product.

OBJECTS OF THE INVENTION

It is accordingly an object of the present invention to provide a method of compounding additives into thermoplastic resins in amounts greater than could normally be efficiently processed.

It is a further object of the invention to provide a method for compounding greater amounts of the aforesaid additive materials into a thermoplastic resin without the necessity of coating these materials prior to said compounding step.

It is another object of the invention to provide a method for improving processing rheology thus allowing an additive filled system to be processed at lower temperatures to protect heat sensitive ingredients and decrease molding cycle times.

It is yet a further object of the invention to allow a more thorough dispersion and wetting of functional additives, such as fire retardants, fillers, reinforcements and pigments in a filled resin system thereby making these additives more effective, and to eliminate the necessity of adding large amounts of waxes and/or stearates as dispersing aids.

SUMMARY OF THE INVENTION

Now, in accordance with the present invention, a method is provided for incorporating fillers, reinforcing agents, flame retardants and other functional additives in a homogeneous manner into thermoplastic resins in amounts greater than could normally be efficiently processed, without the need for precoating or pretreating these materials before incorporation, and for producing more efficient concentrate compounds, without the need for large amounts of waxes and/or stearates. Pursuant to the invention, a processing aid comprising an amorphous particulate silicate containing from about 2% to about 50% water is simply added to the desired additives and/or modifier resins and thermoplastic resin or resins, and the mixture is processed through normal means usually employed in compounding an additive/thermoplastic resin material. The particulate silicate utilized in the invention is one which intumesces or expands to at least twice its original volume at temperatures from about 250° to 1100° F. Since the lower threshold to initiate expansion can be somewhat variable between 250° and 275° F., it is preferable that the mixture of thermoplastic resin, additive or additives, and processing aid is therefore heated while being blended to about 275° F. or above to insure intumescing or expansion of the silicate during processing or compounding. The mixture as in normal processing or compounding, must, of course, also be heated to above the melting point of the thermoplastic resin. This processing can consist of the simple blending of ingredients in a mixer, and then feeding this blend to a heated compounding screw extruder, or alternately, the ingredients can be metered in the proper proportion directly to the screw, wherein the resin is caused to melt by both heat applied to the extruder barrel and heat which is generated by the mechanical action of the extruder. Alternatively, the processing aid, along with the desired additives and/or modifier resin, can be incorporated into a melted resin stream within the blending device, or it can be added to a melted resin stream which already contains the desired additives and/or modifier resin. For the processing aid to function correctly, it is only necessary that the resin, additives and processing aid be blended at a temperature which is both above the intumescing temperature of the processing aid, and also above the melting point of the resin component of the mixture. As the melted resin and additives pass through the extruder, the mixing action of the screw, in conjunction with the action of the processing aids of the present invention, causes the additive(s) to be incorporated into the melted base resin, forming a homogeneous melt mixture. This melt mixture may then be directly converted into a finished product, or it may be extruded, cooled, and cut or ground into pellets to be subsequently used at a later time in an extrusion, injection, compression, or blow molding or other process to produce a finished product by either employing these pellets directly, or by blending them with other materials, such as virgin resin pellets.

DETAILED DESCRIPTION OF INVENTION

It should be noted that the novel processing aid of the present invention is simply mixed with the other ingredients, thereby eliminating the necessity of laboriously pretreating or precoating the additives in the mixture with the processing aid or coupling agent before thermal compounding. Most previously known methods of incorporating large amounts of additives require that the surface of the additive be first modified by means of a processing aid or coupling agent. These coupling agents usually consist of a compound containing molecules which have a structure such that one portion of the molecule has an affinity for the additive or filler being used, and another portion of the molecule has an affinity for the resin portion of the compound. To be effective, these coupling agents must be applied to the surface of the additive or filler in such a manner as to insure that as much of the filler's surface as possible is coated with a monomolecular layer of coupling agent by means of the attachment of the filler receptive portion of the coupling agent molecule to the surface of the filler. This process leaves the resin receptive portion of the coupling agent molecule exposed so that the character of the outside surface of the thus modified filler particle becomes resin receptive, and is more easily wetted by the melted resin. Because additives or fillers in most cases consist of finely divided, or high surface area materials, this coating procedure is quite complex and costly. In most instances it is required that the coupling agent be dissolved in a solvent, which resultant solution is then carefully sprayed onto the filler while the filler is subjected to high shear mixing in order to cause a thorough wetting of the filler with the solution. The solvent must then be removed from the system through drying before the thus modified filler can be used in a compounding process.

The advantages of being able to simply add a processing aid for the above intended purposes without employing pretreatment is obvious. By simply requiring that the proper amount of the processing aids of the present invention be added to the other ingredients before or during compounding, significant savings in time, effort and capital expense are realized. The incorporation of these novel processing aids may be accomplished by simply admixing it with one, or some, or all of the compound components or by separately metering the correct amount of processing aid to the compounding screw in continuous production equipment, or by any other method which serves to add the proper amount of processing aid to the system.

The novel processing aids disclosed herein consist of materials in which the non-aqueous components are predominantly amorphous alkali metal silicates, which contain from about 2% to about 50% water, and preferably between about 5% and about 25% water, and which have the property of intumescence, whereby when heated they expand to at least twice their original volume into particles of a spumiform, hollow, or frothing nature. To be effective as a processing aid, these silicates are incorporated into a compound on a weight basis at a level of about 0.05% to 2%, and preferably at a level of about 0.1% to 0.5%. Particularly effective materials are those such as described in my U.S. Pat. Nos. 5,246,654 and 5,501,826, incorporated herein by reference, and consist of a free-flowing alkali metal silicate-based particulate material in which said silicate is the majority non-aqueous component and is present as an amorphous phase; the particles of said particulate having a moisture content of about 5 to 40%, and being expandable upon heating at a temperature in the range of about 250° F. to about 1100° F.

To facilitate adequate dispersion of the particles of the herein disclosed processing aids within the intended compound, it is advantageous to comminute them to the point where the particles are of such a size that they will pass through a U.S. standard 100 mesh screen. For ease of handling, these comminuted particles may be incorporated into pellets or granules, optionally along with diluents or other functional additives such as colorants, extenders, flame retardants, fillers, blowing agents, impact modifiers and reinforcing agents, by employing a binder which will melt at or below normal Thermoplastic resin processing temperatures, as long as the pelletizing or granulating temperature is kept below about 250° F., which temperature is below that at which the particles expand or intumesce as mentioned above. Additionally, these comminuted particles may be incorporated into organic liquid carriers such as mineral oils and fatty acid derivatives as a dispersion, optionally along with the aforesaid additives. In use, such liquid dispersions are subsequently employed by metering the desired amount of dispersion to a stream of virgin resin pellets and this mixture is then fed to a heated screw extruder for further processing.

The invention is further illustrated in the following Examples, which are not intended to delimitate the invention.

EXAMPLE I

Compound A consisting of 50% pine wood flour and 50% high density polyethylene resin was processed in a heated screw mixer at a temperature of 320° F. for 2.75 minutes. The resultant mass was then heat/compression molded into test plaques having dimensions of approximately 5"×3"× 0.25". The test plaques were allowed to cool, and were subsequently cut into strips having the dimensions of 5" long by 0.5" wide by 0.25" thick. Test strips of a second compound, B, were prepared using the same procedure as for compound A, with the exception that compound B also contained 0.4% of a silicate based processing aid of the present invention which was prepared by combining 2500 parts of alkali metal silicate solution with 50 parts of hydrous magnesium silicate and 100 parts of 20% boric acid solution. This mixture was heated and water was allowed to evaporate until enough water was driven off to yield a moisture level in the mixture of 54%. The mixture was comminuted and further dried such that the comminuted particles had an average moisture content of 22%. These dried particles were subsequently comminuted to yield a particulate, the particles of which all passed through a 325 mesh U.S. standard screen. The secant modulus of elasticity for each compound was then determined with a tensiometer employing a full scale of 100 lbs., a chart speed of 12 cm/min., and a crosshead speed of 0.05"/min. Compound A yielded a secant modulus of 208,730 psi, whereas compound B, containing 0.4% processing aid of the present invention, yielded a value of 246,650 psi. The higher stiffness value for compound B evidences the fact that the filler in this compound was more uniformly wetted with, and dispersed within the resin portion of the compound.

EXAMPLE II

Linear Low Density Polyethylene was compounded with 2% of an inorganic colorant (Pigment Orange 21). The resultant compound was injection molded into a test plaque (test plaque A) having a thickness of 0.090". A second test plaque (test plaque B) was produced using the same materials and procedures with the exception that 0.25% of the processing aid of Example I was added to the resin and pigment in the compounding step.

To determine the degree of pigment dispersion and its resultant surface area within the matrix, the opacity of each test plaque was determined by measuring its light transmittance. Test plaque B containing the dispersing aid of the present invention was found to transmit only 46.9% of the light transmitted by test plaque A. Additionally, the test plaque containing the dispersing agent had a visually higher intensity of color.

EXAMPLE III

To determine the ability of the processing aids of the present invention to facilitate the molding of a variety of polymer compositions, spiral flow tests were conducted. In this test, materials are processed in a heated screw injection molding machine fitted with a ⅛" diameter, 36" length spiral test mold. The design of the spiral test mold is such that molten polymer is injected into a point in the mold which is the beginning of the spiral, and molten material flows through the spiral cavity under pressure. As the material courses through the spiral cavity its resistance to flow increases as the material cools, and material flow continues until the flow resistance becomes equal to the pressure being exerted on the material by the injection molding machine, at which time a spiral part with a particular length is achieved. The length of the resultant spiral will correspond to the processing ability of the given material, and specifically it will be a measure of the processability of that material and its ability to effectively fill a mold under a specific set of processing conditions.

For any given material, typical processing conditions, including temperature and pressure, are chosen so that the resultant injection molded spiral will have a significant length while still only partially filling the mold. By employing the same typical operating conditions for a given material both by itself and also with a processing aid, the effectiveness of the processing aid will be shown by comparing the lengths of the spirals achieved with and without the processing aid, the longer spirals indicating better processability.

For the above described spiral mold test, five different typical injection molding compounds were chosen: 1.) thermoplastic elastomer, 2.) Acrilonitrite-Butadiene-Styrene (ABS), 3.) polypropylene homopolymer, 4.) 40% glass filled polypropylene, and 5.) 6% carbonate filled high density polyethylene (HDPE). Each of these compounds were run with and without a processing aid of the present invention by first feeding a selected compound to the test machine and adjusting the operating parameters until steady-state conditions were achieved along with a satisfactory spiral length, at which time three representative spirals were collected. The feed was then changed to the same material premixed with 0.25% of the processing aid of Example I, and when steady-state conditions were again achieved, three representative spirals were also collected. The lengths of the spirals for each material with and without processing aid of the present invention were then determined and compared on a material-by-material basis.

Table I lists the average of the three spiral lengths achieved with each of the compounds with and without processing aid of the present invention. In all cases the compounds containing the processing aid exhibited increased lengths, indicative of better processability.

TABLE I

| Compound | Spiral Length without Processing Aid (cm) | Spiral Length with Processing Aid (cm) | % Increase |
| --- | --- | --- | --- |
| 1 | 51.54 | 55.56 | 7.8% |
| 2 | 36.99 | 39.53 | 6.9% |
| 3 | 53.29 | 55.62 | 4.4% |
| 4 | 52.28 | 53.45 | 2.2% |
| 5 | 35.29 | 36.20 | 2.6% |

Longer spiral lengths are also indicative of compounds which have better processing rheology and which will fill mold details to a higher degree, show fewer melt stream knit lines in complicated molds, and which can be run at a cooler processing temperature thereby lowering molding cycle times and increasing productivity.

While certain preferred embodiments of the invention have been described herein in detail, numerous alternative embodiments are contemplated as falling within the scope of the invention.

What is claimed is:

1. In the method for compounding a functional additive for a thermoplastic resin into the said resin by blending the additive with the resin at a temperature above the melting point of the resin; the improvement enabling better dispersion of the additive in the resin, and/or better processing rheology; comprising:

incorporating as a processing aid in combination with the additive and resin, from 0.05 to 2.0% by weight of said combination of processing aid, additive and resin of an amorphous particulate silicate which contains from about 2% to about 50% water and which intumesces and expands to at least twice its original volume upon being heated to a temperature range the lower threshold of which is between 250° and 275° F.; forming a melt mixture by blending and heating the mixture of resin, additive and processing aid to a temperature which is both above the intumescing temperature for said particulate silicate and above the melting point of the resin to form a melt mixture; and forming the melt mixture into a molded or extruded pellet or product.

2. A method in accordance with claim 1, wherein the said blended and heated mixture incorporating the processing aid is directly utilized in a molding or extrusion process.

3. A method in accordance with claim 1, wherein the said blended and heated mixture incorporating the processing aid is formed into pellets and cooled, to enable subsequent use of the said pellets in molding or extrusion processes.

4. A method in accordance with claim 3, further including using said pellets as an additive concentrate by blending the pellets with virgin resin pellets, the blended mixture thereby being utilized in a molding or extrusion process.

5. A method in accordance with claim 1, wherein said additive is selected from the group consisting of colorants, pigments, extenders, flame retardants, fillers, blowing agents, surface modifiers, density modifiers, impact modifiers, thermal and electrical conductivity modifiers and reinforcing agents.

6. A method in accordance with claim 1, wherein said additive is particulate.

7. A method in accordance with claim 1, wherein said additive comprises fibers.

8. A method in accordance with claim 1, wherein said silicate contains from about 5% to 25% water, and said processing aid is incorporated as from 0.1 to 0.5% by weight of the said combination.

9. A method according to claim 1, wherein said processing aid has been comminuted to a point where the particles will pass through a 100 mesh U.S. standard screen.

10. A method according to claim 9, wherein the said comminuted processing aid has been formed into pellets or granules by employing a binder which melts at a temperature below the intumescing temperature of said comminuted processing aid.

11. A method according to claim 10, wherein the pellets or granules further include diluents, fillers or additives.

12. A method according to claim 9, wherein said comminuted processing aid has been incorporated in an organic liquid carrier as a dispersion.

13. A method according to claim 12, wherein the dispersion further includes diluents, fillers or additives.

* * * * *